United States Patent [19]

Mizzoni et al.

[11] 4,102,805

[45] Jul. 25, 1978

[54] CATHODOLUMINESCENT AND PHOTOLUMINESCENT GLASSES

[75] Inventors: Mary S. Mizzoni; Richard F. Reade, both of Corning, N.Y.

[73] Assignee: Corning Glass Works, Corning, N.Y.

[21] Appl. No.: 773,201

[22] Filed: Mar. 1, 1977

[51] Int. Cl.$^2$ ............................ C03C 3/28; C03C 3/04
[52] U.S. Cl. ................................. 252/301.4 F; 106/52
[58] Field of Search ............................. 106/52, 39.7; 252/301.4 F

[56] References Cited

U.S. PATENT DOCUMENTS

| | | | |
|---|---|---|---|
| 3,457,182 | 7/1969 | Lee et al. | 252/301.4 F |
| 3,471,408 | 10/1969 | Young | 252/301.4 F |
| 3,663,474 | 5/1972 | Lee et al. | 252/301.4 F |
| 3,843,551 | 10/1974 | Muller | 106/39.7 |

*Primary Examiner*—O. R. Vertiz
*Assistant Examiner*—Mark Bell

*Attorney, Agent, or Firm*—Clinton S. Janes, Jr.; Clarence R. Patty, Jr.

[57] ABSTRACT

The instant invention relates to the production of crystal-free, transparent glass articles which emit a strong bluish luminescence when excited by either ultraviolet or cathode rays. Such glass articles are prepared from aluminosilicate compositions which consist essentially, in terms of mole percent on the oxide basis, of about 15–30% $Al_2O_3$ and 45–70% $SiO_2$, the sum of those two components constituting at least 75 mole percent, but no more than about 95 mole percent, of the total composition, and 0.025–2% europium, expressed as $Eu_2O_3$. The remainder of the composition is generally made up of compatible monovalent, divalent, and/or trivalent modifying oxides. The desired high degree of luminescence is brought about by exposing the glass articles to a reducing atmosphere at a temperature below the softening point of the glass.

5 Claims, No Drawings

CATHODOLUMINESCENT AND PHOTOLUMINESCENT GLASSES

BACKGROUND OF THE INVENTION

Europium can exist in two oxidation states when present in glass. The more common trivalent state, $Eu^{+3}$, emits a moderately strong reddish photoluminescence, i.e., upon exposure to ultraviolet radiation, particularly where europium is included in high concentrations; but its cathodoluminescence, i.e., its emission when subjected to cathode rays, is quite weak. The divalent state, $Eu^{+2}$, can emit a strong bluish luminescence under both forms of excitation, viz., ultraviolet and cathode rays. However, in many conventionally melted, high temperature glasses a mixture of the two valence states will exist such that the luminescence color exhibited under ultraviolet or cathode ray excitation is the result of contributions from both valence states. Hence, luminescence colors can range from violet or violet-blue at low europium concentrations, thereby indicating a predominance of $Eu^{+2}$ emission, to deep pink or red at high europium concentrations, thereby evidencing a predominance of $Eu^{+3}$ emission. However, the cathodoluminescent efficiency of such glasses is, in the main, very poor. It has been postulated that the presence of the relatively inefficient $Eu^{+3}$ ions degrades the efficiency of the $Eu^{+2}$ ions which are present in the glass. Enhancement of the $Eu^{+2}$ ion concentration in the glass has been attempted via melting the glass batch under reducing conditions, but such trials have not been uniformly satisfactory and, furthermore, the procedures required are cumbersome and not readily adaptable to commercial glass melting operations.

It has long been recognized that crystals commonly luminesce with much higher efficiencies than do glasses of like composition. Nevertheless, the transparency and freedom from light-scattering defects intrinsically present in glass articles have stimulated continued research to develop glass compositions which will luminesce brilliantly when subjected to a beam of high voltage electrons. Such glasses would be particularly suitable for the formation of transparent faceplates or screens for cathode ray tubes or other applications where image contrast or image resolution is of vital importance.

Unfortunately, with few exceptions, this research has not been rewarding in that the glasses developed have generally demonstrated poor cathodoluminescence efficiency. For example, the large majority of the glasses produced exhibited efficiencies of less than about 1%. Therefore, a cathodoluminescence efficiency of 1% has been deemed a baseline for certifying an improved glass.

OBJECTIVE OF THE INVENTION

The primary objective of the instant invention is to provide a transparent, crystal-free glass which will display a strong bluish luminescence when impinged by ultraviolet or cathode rays and which will exhibit a cathodoluminescence efficiency of at least 1%.

SUMMARY OF THE INVENTION

That objective can be achieved in glass articles which consist essentially, in terms of mole percent on the oxide basis, of about 15-30% $Al_2O_3$ and 45-70% $SiO_2$, the sum of those two components constituting at least 75 mole percent, but no more than 95 mole percent, of the total composition, and at least 0.025% europium, expressed as $Eu_2O_3$. The remainder of the composition will consist of other compatible metal oxides which can improve the melting and forming characteristics of the glass and/or modify the physical properties thereof. Such would include well-recognized network formers such as $B_2O_3$ and $P_2O_5$ and network modifiers such as the alkali metals, divalent metal oxides and, in particular, the alkaline earth metals, and trivalent metal oxides, with $Y_2O_3$ and $La_2O_3$ being especially useful. Such additions will be included in an amount of at least about 3 mole percent. The method of the invention comprehends three general steps. First, a batch of the proper composition is melted and simultaneously cooled and a glass article of a desired geometry shaped therefrom. Second, the glass article is exposed to a reducing environment at an elevated temperature below the softening point of the glass for a period of time sufficient to produce at least a surface layer on the glass article wherein the europium is present as $Eu^{+2}$ ions. Third, the glass article is cooled to room temperature.

The temperature of firing in the reducing environment is dependent upon the composition of the glass. For example, with soft glasses, commonly containing monovalent ions such as the alkali metal ions, temperatures in the vicinity of 600° C. will be operable. In contrast, with harder glasses containing divalent and/or trivalent metal oxides, the firing will be conducted at a temperature in excess of 775° C., but less than about 950° C., with the preferred temperatures ranging between about 800°–900° C. Hence, incomplete conversion to $Eu^{+2}$ is encountered at temperatures below about 775° C., whereas some degree of deformation or softening of the glass is commonly experienced at temperatures above about 950° C. In all cases, the maximum firing temperature will be held below the softening point of the particular glass.

The time required for the firing step is temperature dependent and the progress of the reaction generally follows the law of diffusion, i.e., where the temperature is maintained constant, the rate of penetration, or the distance within the glass wherein the europium is reduced to $Eu^{+2}$ ions, is proportional to the square root of time. In general, a firing time of at least about two hours will be required, with 4–16 hours being commonly employed.

Various gaseous reducing atmospheres are effective. For example, mixtures of carbon dioxide and carbon monoxide can be operable as can an atmosphere of hydrogen. A preferred embodiment employs forming gas, a gaseous mixture consisting of 92 volume percent $N_2$ and 8 volume percent $H_2$. This combination of gases is relatively inexpensive and avoids the hazards of the hydrogen atmosphere.

DISCUSSION OF THE PRIOR ART

U.S. Pat. No. 2,049,765 discloses alkali metal borosilicate glasses containing a number of sensitizing agents in particulate form which will luminesce when subjected to ultraviolet or cathode rays. More specifically, the patent describes a colloidally-dispersed, crystalline structure in a glass matrix — hence, an article having the structure of a two-phase system. Europium compounds were alleged to be suitable as sensitizing agents but no exemplary composition of such was provided. Furthermore, there is no disclosure whatever regarding the firing of the glassy-crystalline articles in a reducing environment.

U.S. Pat. No. 3,374,381 describes the fabrication of multi-color photoluminescent glass systems wherein a structure is made up of individual glass elements. These glass elements preferably have the same base components, such that the separate members can be joined together relatively easily, but will be doped with different photoluminescent agents. Hence, when subjected to long wavelength ultraviolet radiation, the different glass elements would luminesce in various colors. The patent mentions the development of glass compositions which will exhibit a bluish photoluminescence and three exemplary compositions are provided, two employing copper and a single example utilizing europium. However, there is no teaching whatever in the patent regarding the firing of glasses in a reducing environment and the sole europium-containing example involved a base glass composition consisting, in mole percent, of 29.8% MgO, 10.6% $Al_2O_3$, and 59.6% $SiO_2$ (column 6, lines 46-56), therefore outside of the composition area operable in the instant invention. Finally, there is no reference made to cathodoluminescence so, obviously, there is no discussion as to the efficiency displayed by the products of the patented invention.

U.S. Pat. No. 3,459,673 describes the preparation, via a hydrolysis technique, of rare earth-doped silica products exhibiting luminescence. Although europium is mentioned as a useful dopant, there is no disclosure of firing the articles in a reducing atmosphere, there is no disclosure regarding a bluish luminescence under either ultraviolet or cathode rays, and the very high silica contents render the glasses far removed from those of the present invention.

U.S. Pat. No. 3,522,191 discloses the melting of europium-containing glasses under reducing conditions, the base composition of which include substantial amounts of $B_2O_3$ and/or $P_2O_5$. Such glasses are, self-evidently, outside of the aluminosilicate glasses of the instant invention. Of particular interest, however, is Glass No. 25 in Example III which has the same composition as the sole europium-containing example of U.S. Pat. No. 3,374,381, supra. The comments made by the patentees (who are also the patentees of Patent No. 3,374,381, supra) regarding Glass No. 25 and others indicated a lack of strong luminescence therein and that their $B_2O_3$ and/or $P_2O_5$-containing glasses constituted a marked improvement thereover. Those comments also underscored the fact, noted above in the section of the present specification entitled Background of the Invention, that attempts to produce high $Eu^{+2}$ ion concentrations in glasses through melting under reducing conditions have been less than uniformly satisfactory. Thus, the instant invention is based upon firing the glass in a reducing environment after it has been shaped into an article.

DESCRIPTION OF PREFERRED EMBODIMENTS

Table I reports a number of approximate glass compositions, expressed in terms of mole percent on the oxide basis, illustrating the operable parameters of the instant invention. (Table IA recites the same glass compositions, but expressed in terms of parts by weight on the oxide basis.) The batch ingredients therefor can comprise any materials, either the oxides or other compounds, which, when melted together, will be converted to the desired oxide in the proper proportions. Some chloride is retained in the glass and, since it is not known with which cation(s) it is combined, it is simply reported in terms of $CaCl_2$, the actual batch ingredient employed.

The batch ingredients for the individual examples were compounded, ballmilled together to assist in achieving a homogeneous melt, and deposited in platinum crucibles. (Larger scale melts involving pots or continuous melting tanks can, of course, be undertaken.) The crucibles were covered, placed in a furnace operating at about 1650° C., and the melts maintained therewithin for 16 hours with stirring. The melts were then poured into steel molds to yield slabs having dimensions of about 10 inches × 4 inches × ¼ inch and those slabs were immediately transferred to annealers operating at 700°–900° C.

The slabs were annealed to room temperature to allow observation of glass quality and to permit pieces to be cut therefrom. For example, tests for photoluminescence and cathodoluminescence were conducted on polished glass plates of about 10 × 10 × 1 millimeters.

Table I also records the Annealing Point (A.P.) and Strain Point (St.P.) determinations in °C. conducted on several of the glasses in accordance with conventional measuring techniques.

TABLE I

|  | 1 | 2 | 3 | 4 | 5 | 6 | 7 | 8 |
|---|---|---|---|---|---|---|---|---|
| $SiO_2$ | 60.3 | 60.3 | 60.4 | 60.3 | 60.6 | 60.7 | 49.8 | 60.1 |
| $Al_2O_3$ | 20.4 | 20.5 | 20.5 | 20.4 | 20.6 | 20.6 | 25.8 | 20.4 |
| CaO | 19.2 | 19.2 | 18.9 | 18.7 | 18.4 | 18.1 | 22.0 | 18.0 |
| $CaCl_2$ | — | — | — | — | — | — | 1.0 | 1.2 |
| $Na_2O$ | — | — | — | — | — | — | 1.0 | — |
| $Eu_2O_3$ | 0.03 | 0.06 | 0.2 | 0.3 | 0.45 | 0.6 | 0.5 | 0.3 |
| A.P. | — | — | — | — | — | — | — | 838° |
| St.P. | — | — | — | — | — | — | — | 794° |

|  | 9 | 10 | 11 | 12 | 13 | 14 | 15 | 16 |
|---|---|---|---|---|---|---|---|---|
| $SiO_2$ | 59.9 | 59.6 | 67.5 | 50.1 | 50.3 | 67.1 | 67.0 | 67.1 |
| $Al_2O_3$ | 20.4 | 20.2 | 17.5 | 26.0 | 26.1 | 17.4 | 17.4 | 17.4 |
| CaO | 17.9 | 17.8 | 13.7 | 22.6 | — | — | — | — |
| $CaCl_2$ | 1.2 | 1.2 | — | — | — | — | — | — |
| MgO | — | — | — | — | 23.1 | 15.0 | — | — |
| SrO | — | — | — | — | — | — | 15.0 | — |
| BaO | — | — | — | — | — | — | — | 15.1 |
| $Eu_2O_3$ | 0.6 | 1.2 | 1.3 | 1.3 | 0.5 | 0.5 | 0.5 | 0.5 |
| A.P. | — | — | — | — | 802° | — | 863° | — |
| St.P. | — | — | — | — | 763° | — | 814° | — |

|  | 17 | 18 | 19 | 20 | 21 | 22 | 23 |
|---|---|---|---|---|---|---|---|
| $SiO_2$ | 67.0 | 66.3 | 66.9 | 60.0 | 82.2 | 75.5 | 71.0 |
| $Al_2O_3$ | 17.4 | 23.2 | 23.4 | 21.9 | 1.2 | — | 1.1 |
| ZnO | 15.0 | — | — | — | — | — | — |
| $Y_2O_3$ | — | 10.0 | — | — | — | — | — |
| $La_2O_3$ | — | — | 9.2 | — | — | — | — |
| $K_2O$ | — | — | — | 6.0 | — | 16.5 | 3.3 |
| $Na_2O$ | — | — | — | 6.0 | 4.1 | — | 3.3 |
| $Li_2O$ | — | — | — | 6.0 | — | — | 3.3 |
| $B_2O_3$ | — | — | — | — | 12.2 | 7.7 | — |
| SrO | — | — | — | — | — | — | 17.7 |
| $Eu_2O_3$ | 0.5 | 0.6 | 0.6 | 0.2 | 0.3 | 0.3 | 0.3 |
| A.P. | 768° | 877° | 853° | — | — | — | — |
| St.P. | 726° | 833° | 809° | — | — | — | — |

TABLE IA

|  | 1 | 2 | 3 | 4 | 5 | 6 | 7 | 8 |
|---|---|---|---|---|---|---|---|---|
| $SiO_2$ | 53.3 | 53.2 | 53.3 | 52.8 | 52.5 | 52.2 | 41.5 | 52.0 |
| $Al_2O_3$ | 30.7 | 30.7 | 30.6 | 30.4 | 30.3 | 30.1 | 36.6 | 30.0 |
| CaO | 15.9 | 15.8 | 15.5 | 15.3 | 14.9 | 14.6 | 17.1 | 14.6 |
| $CaCl_2$ | — | — | — | — | — | — | 1.5 | 1.9 |
| $Na_2O$ | — | — | — | — | — | — | 0.8 | — |
| $Eu_2O_3$ | 0.16 | 0.31 | 0.93 | 1.5 | 2.3 | 3.1 | 2.4 | 1.5 |

|  | 9 | 10 | 11 | 12 | 13 | 14 | 15 | 16 |
|---|---|---|---|---|---|---|---|---|
| $SiO_2$ | 51.2 | 49.7 | 57.5 | 40.8 | 44.5 | 61.1 | 53.4 | 48.6 |
| $Al_2O_3$ | 29.6 | 28.7 | 25.4 | 36.0 | 39.2 | 27.0 | 23.6 | 21.4 |
| CaO | 14.3 | 13.9 | 10.9 | 17.2 | — | — | — | — |
| $CaCl_2$ | 1.9 | 1.8 | — | — | — | — | — | — |
| MgO | — | — | — | — | 13.7 | 9.2 | — | — |
| SrO | — | — | — | — | — | — | 20.7 | — |
| BaO | — | — | — | — | — | — | — | 27.9 |
| $Eu_2O_3$ | 3.0 | 5.8 | 6.3 | 6.0 | 2.6 | 2.7 | 2.4 | 2.1 |

TABLE IA-continued

|        | 17   | 18   | 19   | 20   | 21   | 22   | 23   |
|--------|------|------|------|------|------|------|------|
| $SiO_2$ | 55.9 | 45.3 | 40.  | 51.1 | 78.7 | 67.3 | 61.5 |
| $Al_2O_3$ | 24.7 | 26.9 | 24.2 | 31.8 | 1.9  | —    | 1.6  |
| $ZnO$  | 17.0 | —    | —    | —    | —    | —    | —    |
| $Y_2O_3$ | —   | 25.6 | —    | —    | —    | —    | —    |
| $La_2O_3$ | —  | —    | 33.1 | —    | —    | —    | —    |
| $K_2O$ | —    | —    | —    | 8.0  | —    | 23.1 | 4.5  |
| $Na_2O$ | —   | —    | —    | 5.3  | 4.1  | —    | 3.0  |
| $Li_2O$ | —   | —    | —    | 2.5  | —    | —    | 1.4  |
| $B_2O_3$ | —  | —    | —    | —    | 13.6 | 8.0  | —    |
| $SrO$  | —    | —    | —    | —    | —    | —    | 26.5 |
| $Eu_2O_3$ | 2.5 | 2.2 | 2.0 | 1.2 | 1.7 | 1.6 | 1.4 |

Table II records several treatments in reducing atmospheres which were applied to the exemplary compositions of Table I. As was explained above, the slabs formed from the crucible melts were annealed to room temperature to enable test samples to be cut therefrom. Table II recites visual observations of photoluminescence of the polished glass plates exposed to sources of ultraviolet radiations having a wavelength of 2537Å and 3650Å, respectively, and cathodoluminescence resulting from the bombardment of electrons having an energy of 11 kilovolts (kV). It must be recognized that the annealing to room temperature prior to firing in a reducing environment is not mandatory for the successful operation of the invention. Hence, if desired, the glass shape formed from the molten batch my be immediately subjected to the firing step and then cooled to room temperature. Such practice can increase the speed of the overall process while also providing energy savings.

Forming gas (92% by volume $N_2$ — 8% by volume $H_2$) was utilized as the source of a reducing atmosphere in the firings reported in Table II because of its safety and relative cheapness. The influence of moisture on the action of the reducing environment was studied through the use of "wet" forming gas. That is, the forming gas was passed through a container of distilled water prior to its introduction into the firing chamber. Moisture was thereby picked up from the reservoir of water and carried into the firing chamber. In like manner, the comparison examples of "wet" nitrogen employed the same apparatus.

The test glass samples of Table II were placed within a sealed furnace tube with the appropriate gaseous atmosphere flowing at a rate of 100 cc/minute. The furnace tube was purged with the treating gas prior to the actual firing step to insure reproducibility of results. In each case, the glass was heated from room temperature to the recorded temperature at furnace rate which, in the present case, was about 500° C./minute. It will be understood that much slower, or even faster, heatup rates are possible. However, care must be exercised where more rapid heatup rates are employed to avoid thermal breakage.

TABLE II

| Example No. | Heat Treatment | 2537Å | 3650Å | 11 kV Electrons |
|---|---|---|---|---|
| 1 | None | Blue-white | Blue | Violet-blue |
| 1 | 900° C.-16 hrs. forming gas | Strong blue | Strong blue | Strong blue |
| 2 | None | Blue-white | Blue | Blue-violet |
| 2 | 900° C.-16 hrs. forming gas | Strong blue | Strong blue | Strong blue |
| 3 | None | Lavender | Blue-white | Violet |
| 3 | 900° C.-16 hrs. forming gas | Bright blue | Bright blue | Bright blue |
| 4 | None | Light pink | Light lavender | Lavender |
| 4 | 900° C.-16 hrs. forming gas | Bright blue | Bright blue | Bright blue |
| 5 | None | Pink | Lavender | Pink |
| 5 | 900° C.-16 hrs. forming gas | Bright blue | Bright blue | Bright blue |
| 6 | None | Reddish-pink | Pink | Deep pink |
| 6 | 900° C.-16 hrs. forming gas | Bright blue | Bright blue | Bright blue |
| 7 | None | Orange-pink | Violet pink | Violet pink |
| 7 | 900° C.-16 hrs. forming gas | Bright blue | Bright blue | Bright blue |
| 7 | 900° C.-16 hrs. wet forming gas | Bright blue | Bright blue | Bright blue |
| 7 | 925° C.-16 hrs. forming gas | Bright blue-glass softened | Bright blue-glass softened | Bright blue-glass softened |
| 8 | None | Lavender | Blue violet | Violet pink |
| 8 | 850° C.-16 hrs. Air | Lavender | Blue violet | Violet pink |
| 8 | 850° C.-16 hrs. Wet $N_2$ | Lavender | Blue violet | Violet pink |
| 8 | 850° C.-16 hrs. forming gas | Bright blue | Bright blue | Bright blue |
| 8 | 900° C.-16 hrs. forming gas | Bright blue | Bright blue | Bright blue |
| 8 | 950° C.-16 hrs. forming gas | Bright blue - glass softened | Bright blue - glass softened | Bright blue - softened |
| 9 | None | Deep pink | Violet-pink | Deep pink |
| 9 | 900° C.-16 hrs. Air | Deep pink | Violet-pink | Deep pink |
| 9 | 900° C.-16 hrs. $N_2$ | Deep pink | Violet-pink | Deep pink |
| 9 | 900° C.-16 hrs. forming gas | Bright blue | Bright blue | Bright blue |
| 9 | 900° C.-16 hrs. wet forming gas | Bright blue | Bright blue | Bright blue |
| 10 | None | Deep red | Deep red | Deep red |
| 10 | 900° C.-16 hrs. forming gas | Bright blue | Bright blue | Bright blue |
| 10 | 900° C.-16 hrs. wet forming gas | Bright blue | Bright blue | Bright blue |
| 11 | None | Red-orange | Deep pink | Deep pink |
| 11 | 750° C.-16 hrs. forming gas | Violet-pink | Violet-blue | Violet-blue |
| 11 | 800° C.-16 hrs. forming gas | Bluish-white | Bluish-white | Bluish-white |
| 11 | 825° C.-16 hrs. forming gas | Bright blue | Bright blue | Bright blue |

TABLE II-continued

| Example No. | Heat Treatment | 2537Å | 3650Å | 11 kV Electrons |
|---|---|---|---|---|
| 11 | 850° C.-4 hrs. forming gas | Bright blue | Bright blue | Bright blue |
| 12 | None | Red-orange | Orange pink | Deep pink |
| 12 | 750° C.-16 hrs. forming gas | Violet-pink | Violet-blue | Violet-pink |
| 12 | 825° C.-16 hrs. forming gas | Bright blue | Bright blue | Bright blue |
| 12 | 850° C.-4 hrs. forming gas | Bright blue | Bright blue | Bright blue |
| 13 | None | Deep blue | Lavender | Violet-pink |
| 13 | 800° C.-4 hrs. forming gas | Bright blue | Bright blue | Bright blue |
| 13 | 825° C.-16 hrs. forming gas | Bright blue | Bright blue | Bright blue |
| 13 | 900° C.-16 hrs. forming gas | Bright blue - glass softened | Bright blue - glass softened | Bright blue - glass softened |
| 14 | None | Pink | Blue-white | Deep pink |
| 14 | 825° C.-16 hrs. forming gas | Bright blue | Bright blue | Bright blue |
| 14 | 850° C.-16 hrs. forming gas | Bright blue | Bright blue | Bright blue |
| 14 | 950° C.-16 hrs. forming gas | Bright blue- glass softened | Bright blue- glass softened | Bright blue - glass softened |
| 15 | None | Pink | Blue-white | Deep pink |
| 15 | 825° C.-16 hrs. forming gas | Bright blue | Bright blue | Bright blue |
| 15 | 950° C.-16 hrs. forming gas | Bright blue | Bright blue | Bright blue |
| 16 | None | Pink | White | Deep pink |
| 16 | 825° C.-16 hrs. forming gas | Bright blue | Bright blue | Bright blue |
| 16 | 850° C.-16 hrs. forming gas | Bright blue | Bright blue | Bright blue |
| 17 | None | Orange pink | Pink | Deep pink |
| 17 | 825° C.-16 hrs. forming gas | Bright blue | Bright blue | Bright blue |
| 17 | 850° C.-4 hrs. forming gas | Bright blue | Bright blue | Bright blue |
| 17 | 850° C.-16 hrs. forming gas | Bright blue-hazy glass-opalized at 900° C. | Bright blue-hazy glass-opalized at 900° C. | Bright blue-hazy glass-opalized at 900° C. |
| 18 | None | Violet-pink | Lavender-blue | Reddish-pink |
| 18 | 825° C.-16 hrs. forming gas | Bright blue | Bright blue | Bright blue |
| 18 | 900° C.-16 hrs. forming gas | Bright blue | Bright blue | Bright blue |
| 19 | None | Pink | Blue-violet | Pink |
| 19 | 825° C.-16 hrs. forming gas | Bright blue | Bright blue | Bright blue |
| 20 | None | Pink | Blue | Violet |
| 20 | 800° C.-16 hrs. forming gas | Bright blue | Bright blue | Bright blue |
| 20 | 850° C.-16 hrs. forming gas | Bright blue- glass softened | Bright blue- glass softened | Bright blue- glass softened |
| 21 | None | Pink | Lavender | Pink |
| 21 | 650° C.-5 hrs. forming gas | Weak blue | Weak blue | Weak blue |
| 21 | 700° C.-5 hrs. forming gas | Moderate blue | Moderate blue | Moderate blue |
| 21 | 750° C.-16 hrs. forming gas | Moderate blue - glass softened | Moderate blue - glass softened | Moderate blue - glass softened |
| 22 | None | Red | Red | Red |
| 22 | 700° C.-5 hrs. forming gas | Red | Red | Red |
| 22 | 750° C.-5 hrs. forming gas | Red - glass softened | Red - glass softened | Red- glass softened |
| 23 | None | Red-orange | Red-orange | Red-orange |
| 23 | 650° C.-5 hrs. forming gas | Red-orange | Red-orange | Red-orange |
| 23 | 700° C.-5 hrs. forming gas | Red-orange - glass softened | Red-orange - glass softened | Red-orange - softened |

Several features of interest can be discerned from Table II. For example, the untreated glasses of Examples 1-6 illustrate the tendency for the luminescence to acquire an increasingly reddish character as greater amounts of europium are incorporated in the glass. However, after exposure to reducing conditions, each manifests a considerably brighter luminescene, and of a blue color, under both ultraviolet and cathode rays. Visually, the brightness of the luminescence increases from Example 1 through Example 6.

Comparison tests utilizing wet and dry forming gas did not evidence any marked difference in effect therebetween. The use of gaseous atmospheres of nitrogen (a neutral environment) and air (an oxidizing environment) clearly pointed to the need for reducing conditions to secure the presence of $Eu^{+2}$ ions with the consequent blue luminescence.

Treatments at 750° C. of Examples 11 and 12 demonstrated incomplete conversion to $Eu^{+2}$ ions. A temperature of at least about 800° C. appears to be a preferred lower limit for glasses containing divalent or trivalent modifying oxides, depending upon glass composition, and will be determined for each glass of interest. With the softer, monovalent ion glasses, temperatures of about 600° C. will be operable. The upper temperature limit comprises that temperature at which opalization or softening of the glass occurs. Most of the glasses recorded in Table II displayed some degree of softening at 950° C. Exceptions thereto were Examples 7 and 13, which softened at lower temperatures, and Example 17 which opacified.

To prove that the blue surface luminescence was not caused by the development of a transparent surface crystalline phase, Examples 11, 12, and 14, after being exposed to dry forming gas for 16 hours at 950° C., and Example 17, after being fired in dry forming gas for 16 hours at 850° C., were examined by surface X-ray diffraction techniques. Only Example 17, noted as hazy in Table II, exhibited a trace of surface crystallization. The other samples evidenced no trace of crystallization.

Examples 21–23 are softer glasses containing little or no alumina. Thus, Examples 22 and 23 represent glasses in which surface reduction does not take place at temperatures below the glass deformation temperature. Example 21 is illustrative of a borderline composition, with respect to the firing step, in that a weak-to-moderate blue luminescence can be secured at temperatures approaching the softening point thereof. Example 20 can exhibit relatively good blue luminescence but its cathodoluminescence is somewhat less than that of Example 3 containing about the same $Eu_2O_3$ content on the molar basis.

A more detailed examination of the cathodoluminescence behavior of several of the exemplary compositions is set out in Table III. Because these luminescent surfaces are produced by the action of a diffusing gas, viz., hydrogen, the depth and uniformity of the surface layer so produced must be characterized as a function of the penetrating power of impinging electrons to which the surface may be exposed during actual service. Most conventional cathode ray tube phosphors consist of some luminescence activator uniformly distributed within the structure of a host material, customarily a crystalline material.

A measurement of cathodoluminescence intensity versus electron accelerating potential, measured at a constant beam current, for such a uniform material will generally yield a straight line. This linearity indicates that over the electron energy range encountered in the conventional cathode ray tube, such as a television receiver tube, the cathodoluminescence efficiency of the phosphor is constant. Since electrons of different energies penetrate the phosphor to different depths, linearity also illustrates that the efficiency of the phosphor is constant throughout the thickness of the phosphor corresponding to the penetration depth of the impinging electrons. A convenient estimate of electron penetration depth is given by the "penetration limit" defined as that depth beyond which negligible power is transmitted to the material. Penetration limits are set out below for the electron energy range, expressed in electron volts (KEV), customarily obtaining in the cathode ray tube and color television industries. The data are derived from Terrill's Equation recited on page 158 of *An Introduction to Luminescence of Solids*, Humboldt W. Leverenz, Dover Publications, Inc., New York, 1968. A glass density of 2.5 g/cm³ is assumed in the calculations.

| Electron Energy in KEV | Penetration Limit in Microns |
|---|---|
| 5 | 0.25 |
| 10 | 1.00 |
| 15 | 2.25 |
| 20 | 4.00 |
| 25 | 6.25 |

Hence, to provide constant efficiency for electrons up to 25 KEV in energy, the reducing conditions to which the glass is exposed must be capable of insuring the presence of $Eu^{+2}$ ions to a depth of about 6 microns.

Table III records measurements made on several of the examples from Table I over the range of 6–24 kV acceleration potential (6–24 KEV electron energy). The range of linearity of cathodoluminescence intensity and, therefore, of constant efficiency is given as well as the calculated efficiency. Also, the wavelength of maximum photoluminescent intensity and the C.I.E. color coordinates are reported. Finally, Table III reports a measure of aging resistance (AR) expressed in %.

The aging of a cathodoluminescent phosphor is defined as the loss of luminescence intensity under sustained electron bombardment. It is measured during an accelerated aging test in which a sample is exposed to a high current density (30 microamperes/cm²) of high energy electrons (25 kV) for a period of 10 minutes. Aging resistance is defined as the ratio of the intensity of cathodoluminescence after 10 minutes exposure to the test conditions, to the intensity at the commencement of the test.

In general, higher-temperature, longer-time, heat treatments in reducing environments give rise to the most desirable combination of linearity, high efficiency over the electron energy range of most interest, and good aging resistance. It will be appreciated, of course, that optimum conditions must be determined for each individual glass.

In general, the aging resistance of these surface-activated europium-containing glasses is superior to that of most conventional glasses. It is exceeded only by that exhibited by the manganese-doped $RO-Al_2O_3-SiO_2$ glasses disclosed in U.S. Pat. No. 3,962,117.

Although Table III reports visual descriptions of "bright blue" cathodoluminescence, it is apparent from the C.I.E. color coordinates that a range of bluish colors can be obtained, differing principally in saturation. Saturation is that quality of color which differentiates an intense "pure" blue color (saturated) from a pastel blue (relatively unsaturated). Side-by-side comparisons of polished glass plates can be useful in distinguishing such color differences in the respective luminescence emissions.

TABLE III

| Example No. | Heat Treatment | Linear Range (kV) | Efficiency % | Wave Length Å | AR | C.I.E. Coordinates (at 24 kV) | |
|---|---|---|---|---|---|---|---|
| | | | | | | x | y |
| 7 | 900° C. - 16 hrs. forming gas | 6-24 | 1.7 | 4500 | 50 | 0.180 | 0.185 |
| 7 | 900° C. - 16 hrs. wet forming gas | 6-24 | 1.5 | 4600 | 52 | 0.189 | 0.212 |
| 8 | 900° C. - 16 hrs. forming gas | 6-24 | 2.0 | 4300 | 61 | 0.167 | 0.121 |
| 9 | 900° C. - 16 hrs. forming gas | 6-24 | 1.9 | 4450 | 57 | 0.172 | 0.150 |
| 9 | 900° C. - 16 hrs. wet forming gas | 6-24 | 1.7 | 4500 | 56 | 0.176 | 0.166 |
| 10 | None | 6-24 | 0.17 | 6200 | — | 0.615 | 0.317 |

TABLE III-continued

| Example No. | Heat Treatment | Linear Range (kV) | Efficiency % | Wave Length Å | AR | C.I.E. Coordinates (at 24 kV) x | y |
|---|---|---|---|---|---|---|---|
| 10 | 900° C. - 16 hrs. forming gas | 6–24 | 1.4 | 4500 | 49 | 0.183 | 0.200 |
| 10 | 900° C. - 16 hrs. wet formng gas | 6–24 | 1.3 | 4600 | 40 | 0.198 | 0.220 |
| 11 | 825° C. - 16 hrs. forming gas | 6–24 | 0.3 | 4400 | 68 | 0.189 | 0.167 |
| 11 | 850° C. - 4 hrs. forming gas | 6–16 | 1.7 | 4500 | 55 | 0.178 | 0.169 |
| 12 | 825° C. - 16 hrs. forming gas | 6–24 | 0.5 | 4400 | 69 | 0.181 | 0.153 |
| 12 | 850° C. - 4 hrs. forming gas | 6–10 | 1.1 | 4700 | 48 | 0.248 | 0.258 |
| 13 | 850° C. - 4 hrs. forming gas | 6–12 | 1.5 | 4450 | 60 | 0.178 | 0.145 |
| 14 | 825° C. - 16 hrs. forming gas | 6–24 | 1.7 | 4500 | 57 | 0.184 | 0.193 |
| 14 | 850° C. - 16 hrs. forming gas | 6–24 | 1.7 | 4500 | 51 | 0.184 | 0.199 |
| 15 | 825° C. - 16 hrs. forming gas | 6–24 | 2.1 | 4500 | 60 | 0.176 | 0.165 |
| 15 | 950° C. - 16 hrs. forming gas | 6–22 | 2.2 | 4500 | 54 | 0.172 | 0.156 |
| 16 | 825° C. - 16 hrs. forming gas | 6–24 | 1.9 | 4400 | 69 | 0.162 | 0.113 |
| 16 | 850° C. - 4 hrs. forming gas | 6–22 | 1.8 | 4500 | 48 | 0.183 | 0.192 |
| 17 | 825° C. - 16 hrs. forming gas | 6–20 | 1.3 | 4400 | 69 | 0.172 | 0.147 |
| 17 | 800° C. - 4 hrs. forming gas | 6–22 | 1.9 | 4500 | 52 | 0.176 | 0.167 |
| 18 | 825° C. - 16 hrs. forming gas | 6–16 | 1.2 | 4700 | 43 | 0.213 | 0.248 |
| 18 | 900° C. - 16 hrs. forming gas | 6–20 | 1.2 | 4650 | 46 | 0.200 | 0.249 |
| 19 | 825° C. - 16 hrs. forming gas | 6–24 | 1.8 | 4500 | 47 | 0.170 | 0.162 |

Table III clearly demonstrates the superior cathodoluminescent properties exhibited by the glasses of the instant invention. Hence, power conversion efficiencies greater than 1% are customarily achieved and, in some instances, can surpass 2%. Also, the values of aging resistance commonly exceed 50% in the above-described test.

Table IV reports several examples, expressed in mole percent on the oxide basis, which were produced in accordance with the method outlined above for the exemplary compositions of Table I and Annealing Points (A.P.) and Strain Points (St.P.) where measured. (Table IVA records the compositions in terms of weight percent.)

TABLE IV

| | 24 | 25 | 26 | 27 | 28 | 29 | 30 | 31 | 32 | 33 | 34 | 35 | 36 | 37 |
|---|---|---|---|---|---|---|---|---|---|---|---|---|---|---|
| $SiO_2$ | 59.6 | 59.9 | 59.8 | 59.9 | 59.9 | 59.9 | 59.9 | 59.9 | 59.9 | 59.8 | 59.9 | 59.9 | 59.9 | 59.9 |
| $Al_2O_3$ | 10.6 | 19.9 | 20.0 | 20.0 | 19.9 | 9.9 | 10.0 | 10.0 | 20.0 | 10.0 | 20.0 | 20.0 | 20.0 | 20.0 |
| MgO | 29.8 | 19.0 | — | — | — | — | — | — | — | — | — | — | — | — |
| CaO | — | — | 19.9 | — | — | — | — | — | — | — | 16.9 | 16.9 | — | — |
| SrO | — | — | — | — | — | 29.9 | — | — | — | — | — | — | — | — |
| BaO | — | — | — | — | — | — | 29.9 | — | — | — | — | — | — | — |
| ZnO | — | — | — | — | — | — | — | 29.9 | — | — | — | — | — | — |
| CdO | — | — | — | 19.9 | — | — | — | — | — | — | — | — | — | — |
| PbO | — | — | — | — | 19.9 | — | — | — | — | — | — | — | — | — |
| $K_2O$ | — | — | — | — | — | — | — | — | 19.9 | 9.9 | — | 1.0 | — | — |
| $Na_2O$ | — | — | — | — | — | — | — | — | — | 9.9 | 3.0 | 1.0 | 19.9 | — |
| $Li_2O$ | — | — | — | — | — | — | — | — | — | 10.1 | — | 1.0 | — | 19.9 |
| $Eu_2O_3$ | 0.006 | 0.3 | 0.25 | 0.26 | 0.24 | 0.24 | 0.24 | 0.24 | 0.26 | 0.24 | 0.25 | 0.25 | 0.25 | 0.25 |
| A.P. | — | — | — | 766° | 693° | — | — | — | — | 453° | — | — | 764° | 668° |
| St.P. | — | — | — | 702° | 646° | — | — | — | — | 414° | — | — | 707° | 622° |

TABLE IVA

| | 24 | 25 | 26 | 27 | 28 | 29 | 30 | 31 | 32 | 33 | 34 | 35 | 36 | 37 |
|---|---|---|---|---|---|---|---|---|---|---|---|---|---|---|
| $SiO_2$ | 61.0 | 55.1 | 52.6 | 43.4 | 35.4 | 46.1 | 38.7 | 50.4 | 47.3 | 59.8 | 52.5 | 52.5 | 51.7 | 57.0 |
| $Al_2O_3$ | 18.5 | 31.2 | 30.0 | 24.6 | 20.0 | 13.0 | 11.0 | 14.3 | 26.8 | 15.5 | 29.7 | 29.7 | 29.3 | 32.2 |
| MgO | 20.5 | 12.3 | — | — | — | — | — | — | — | — | — | — | — | — |
| CaO | — | — | 16.4 | — | — | — | — | — | — | — | 13.9 | 13.9 | — | — |
| SrO | — | — | — | — | — | 39.8 | — | — | — | — | — | — | — | — |
| BaO | — | — | — | — | — | — | 49.4 | — | — | — | — | — | — | — |
| ZnO | — | — | — | — | — | — | — | 34.1 | — | — | — | — | — | — |
| CdO | — | — | — | 30.9 | — | — | — | — | — | — | — | — | — | — |
| PbO | — | — | — | — | 43.8 | — | — | — | — | — | — | — | — | — |
| $K_2O$ | — | — | — | — | — | — | — | — | 24.7 | 14.3 | — | 0.9 | — | — |
| $Na_2O$ | — | — | — | — | — | — | — | — | — | 9.4 | 2.7 | 0.4 | 17.8 | — |
| $Li_2O$ | — | — | — | — | — | — | — | — | — | 4.6 | — | 1.3 | — | 9.4 |
| $Eu_2O_3$ | 0.05 | 1.14 | 1.3 | 1.1 | 0.9 | 1.1 | 0.9 | 1.2 | 1.2 | 1.3 | 1.3 | 1.3 | 1.3 | 1.4 |

Table V sets out several treatments in reducing atmospheres consisting of dry forming gas to which the glass articles of Table IV were subjected. In like manner to Table II above, Table V recites visual observations of photoluminescence of polished glass plates exposed to sources of ultraviolet radiations having a wavelength of 2537Å and 3650Å, respectively, and cathodoluminescence resulting from the bombardment of electrons having an energy of 11 kilovolts. The treatment in forming gas was carried out similarly to that described in Table II except that in no example was the gas passed through distilled water prior to introduction into the furnace.

A comparison of the visual observations with respect to Examples 7, 9, and 10 of Table III indicated that the luminescence produced utilizing a wet reducing atmosphere was slightly less efficient and, perhaps, the color less saturated than when a dry atmosphere was employed. In any event, no significant advantage was observed with the $H_2O$-containing environment and the elimination of the water column simplifies the procedure and, hence, the use of a dry atmosphere is more desirable from a practical point of view.

Table V

| Ex. No. | Heat Treatment | 2537Å | 3650Å | 11 kV Electrons |
|---|---|---|---|---|
| 24 | None | Weak blue | Weak blue | Very weak blue |
| 24 | 900° C.-16 hrs. | Weak blue | Weak blue | Very weak blue |
| | Glass exhibited a slightly hazy appearance | | | |
| 25 | None | Violet-pink | Blue-white | Very weak pink |
| 25 | 900° C.-16 hrs. | Blue | Blue | Very bright blue |
| 26 | None | Pink | Blue-white | Very weak pink |
| 26 | 900° C.-16 hrs. | Blue | Blue | Very bright blue |
| 27 | None | Bright orange-red | Deep orange-red | Very weak pink |
| 27 | 900° C.-16 hrs. | Flat blue | Dull orange-red | Moderate blue |
| | Glass exhibited a yellow color | | | |
| 28 | None | Bright orange-yellow | Deep orange-red | Very weak pink |
| 28 | 850° C.-16 hrs. | Dead | Dead | Very weak blue |
| | Glass exhibited a black surface skin | | | |
| 29 | None | Orange | Yellow-white | Weak orange pink |
| 29 | 850° C.-16 hrs. | — | — | Moderate blue-white |
| 30 | None | Yellow-orange | Yellow-orange | Very weak pink |
| 30 | 850° C.-16 hrs. | — | — | Weak pink white |
| 31 | Glass became opalized upon cooling from melt | | | |
| 32 | Glass extremely viscous, did not pour | | | |
| 33 | None | Yellow-white | Red | Weak pink orange |
| 33 | 850° C.-16 hrs. | Glass flowed and devitrified | | |
| 33 | 600° C.-5 hrs. | Glass softened and opalized | | |
| 34 | None | Pink | Blue-white | Very weak pink |
| 34 | 900° C.-16 hrs. forming gas | Blue | Blue | Very bright blue |
| 35 | None | pink | Blue-white | Very weak pink |
| 35 | 900° C.-16 hrs. forming gas | Blue | Blue | Very bright blue |
| 36 | None | Salmon pink | Blue-white | Weak orange |
| 36 | 850° C.-16 hrs. forming gas | — | — | Moderate blue |
| 36 | 700° C.-5 hrs. forming gas | — | — | Bright-blue |
| 37 | None | Violet | Light pink | Weak pink-blue |
| 37 | 850° C.-16 hrs. forming gas | — | — | Very bright blue |
| 37 | 650° C.-5 hrs. forming gas | — | — | Bright blue |

Tables IV and V help to illustrate the compositional parameters that must be observed to achieve the desired properties of the inventive glasses. For example, compositions 24, 29, 30, 31, and 33, falling somewhat outside the prescribed ranges of components, exhibited poor luminescence under both ultraviolet radiation and electron bombardment. Example 27 points up that CdO is not as an effective an addition as are the alkaline earth metal oxides and Example 28 demonstrates an adverse effect resulting from extensive additions of lead. The surface skin was thought to be caused by the reduction of the lead oxide to metallic lead.

In summary, glasses consisting solely of $Eu_2O_3$, $Al_2O_3$, and $SiO_2$ are difficult to melt and form, such that other components, i.e., network formers and/or network modifiers, are included in amounts of at least 3 mole percent. As is evident from Tables I and IV, a wide variety of ingredients can be added which will improve the melting and forming characteristics of the glass and impart greater glass stability. In general, divalent metal oxides, and particularly the alkaline earth metal oxides, comprise the preferred additions.

The strength and brilliance of the blue luminescence appear to be enhanced with greater amounts of europium in the glass composition. Therefore, the presence of at least about 0.1 mole percent is preferred. However, the visual appearance does not seem to vary appreciably at concentrations in excess of about 2 mole percent, so that figure is deemed to be a practical maximum.

I claim:

1. An essentially crystal-free, transparent glass article emitting a strong bluish luminescence when excited by ultraviolet or cathode rays consisting essentially, in terms of mole percent on the oxide basis, of about 15–30% $Al_2O_3$ and 45–70% $SiO_2$, the sum of those two components constituting at least 75 mole percent, but not more than about 95 mole percent of the total composition, 0.025–2% europium, expressed as $Eu_2O_3$ but present in the glass as $Eu^{+2}$ ions, and at least about 3% of compatible metal oxides which improve the melting and forming characteristics of the glass and/or modify the physical properties thereof.

2. A glass article according to claim 1 wherein said compatible metal oxides consist of the alkali metal oxides, divalent metal oxides, and trivalent metal oxides.

3. A glass article according to claim 2 wherein said divalent metal oxides consist of alkaline earth metal oxides.

4. A glass article according to claim 2 wherein said trivalent metal oxides consist of $Y_2O_3$ and/or $La_2O_3$ and/or $B_2O_3$.

5. A glass article according to claim 1 wherein said $Eu_2O_3$ is present in an amount of at least about 0.1%.

* * * * *

UNITED STATES PATENT AND TRADEMARK OFFICE
CERTIFICATE OF CORRECTION

PATENT NO. : 4,102,805
DATED : July 25, 1978
INVENTOR(S) : Mary S. Mizzoni and Richard F. Reade It is certified that error appears in the above-identified patent and that said Letters Patent are hereby corrected as shown below:

Column 3, line 19, "4656" should be -- 46-56 --.

Column 3, line 35, "composition" should be -- compositions --.

Column 5, Table IA-continued, Example 19, line 4, "40." should be -- 40.7 --.

Column 5, line 27, "my" should be -- may --.

Columns 11 and 12, Table IVA, Example 25, component $Eu_2O_3$, "1.14" should be -- 1.4 --.

Signed and Sealed this

Thirty-first Day of July 1979

[SEAL]

Attest:

Attesting Officer

LUTRELLE F. PARKER
Acting Commissioner of Patents and Trademarks